(12) United States Patent
Byers et al.

(10) Patent No.: US 10,433,400 B1
(45) Date of Patent: *Oct. 1, 2019

(54) SYSTEM TO DETERMINE THE PLACEMENT OF SMART LIGHT EMITTERS

(71) Applicant: Cisco Technology, Inc., San Jose, CA (US)

(72) Inventors: Charles Calvin Byers, Wheaton, IL (US); Joseph M. Clarke, Cary, NC (US); Gonzalo A. Salgueiro, Raleigh, NC (US); M. David Hanes, Lewisville, NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/124,093

(22) Filed: Sep. 6, 2018

Related U.S. Application Data

(63) Continuation of application No. 15/920,073, filed on Mar. 13, 2018, now Pat. No. 10,098,204.

(51) Int. Cl.
*H05B 37/02* (2006.01)
*B64C 39/02* (2006.01)
(Continued)

(52) U.S. Cl.
CPC ....... *H05B 37/0227* (2013.01); *B64C 39/024* (2013.01); *H05B 37/0272* (2013.01);
(Continued)

(58) Field of Classification Search
CPC .. H05B 37/02; H05B 37/029; H05B 37/0272; H05B 37/0227; H05B 33/0863;
(Continued)

(56) References Cited

U.S. PATENT DOCUMENTS 7,701,362 B2  4/2010  Philiben
8,238,671 B1  8/2012  Babenko et al.
(Continued)

FOREIGN PATENT DOCUMENTS

WO  2009086465 A1  7/2009
WO  2014182974 A1  11/2014
WO  2017115326 A1  7/2017

OTHER PUBLICATIONS

Hasan et al., "Smart Traffic Control Systems with Application of Image Processing Techniques," IEEE Xplore Digital Library, 4 pages. [Abstract Only].
(Continued)

*Primary Examiner* — Haissa Philogene
(74) *Attorney, Agent, or Firm* — Patterson + Sheridan, LLP

(57) ABSTRACT

Techniques relating to a geographic lighting controller. A controller determines a target lighting pattern based on an instruction for a smart lighting effect. The controller retrieves from a database, based on the target geographic location, information identifying a first plurality of smart lights to activate as part of the smart lighting effect. The controller determines a plurality of network addresses for the first plurality of smart lights, based on the retrieved information, generates a lighting effect command relating to the first plurality of smart lights, and transmits the lighting effect command to create the smart lighting effect.

20 Claims, 9 Drawing Sheets

(51) Int. Cl.
*G03B 15/00* (2006.01)
*G06K 9/00* (2006.01)

(52) U.S. Cl.
CPC ...... *B64C 2201/127* (2013.01); *G03B 15/006* (2013.01); *G06K 9/00664* (2013.01)

(58) Field of Classification Search
CPC .. G06F 3/0488; G06F 3/04847; G06F 1/1643; G06F 1/1694; G06F 1/1698; G08C 17/02; G08C 2201/30; G08C 2201/93; G08C 2201/42; G06K 9/00671; G06K 2209/27; B64C 39/024; G03B 15/02
See application file for complete search history.

(56) References Cited

U.S. PATENT DOCUMENTS

| | | | |
|---|---|---|---|
| 8,427,274 B2 | 4/2013 | Jones et al. | |
| 8,706,310 B2 | 4/2014 | Barrilleaux | |
| 8,965,104 B1 | 2/2015 | Hickman et al. | |
| 9,041,731 B2 | 5/2015 | Aliakseyeu et al. | |
| 9,197,842 B2 | 11/2015 | O'Kelley et al. | |
| 9,197,843 B2 | 11/2015 | Mast et al. | |
| 9,226,370 B2 | 12/2015 | Berkvens et al. | |
| 9,613,525 B2 * | 4/2017 | Boyd | F24F 11/30 |
| 9,622,330 B2 | 4/2017 | Lashina et al. | |
| 9,713,231 B2 * | 7/2017 | Kelly | G08C 17/02 |
| 10,098,204 B1 * | 10/2018 | Byers | H05B 37/0227 |
| 10,135,950 B2 * | 11/2018 | Rothera | H04L 67/10 |
| 2016/0261458 A1 | 9/2016 | Huang | |

OTHER PUBLICATIONS

"Distributed Intellegence," Cisco Kinetic for Cities Lighting [Accessed Online, Mar. 15, 2018] https://www.cisco.com/c/en/us/solutions/industries/smart-connected-communities/city-lighting.html.

N.H.C. Yung and A.H.S Lai, "An Effective Video Analysis Method for Detecting Red Light Runners," IEEE Xplore Digital Library, [Abstract Only] [Accessed Online Mar. 14, 2018] http://ieeexplore.ieee.org/abstract/document/938581.

Fujitsu Laboratories Ltd, "Fujitsu Develops Traffic-Video-Analysis Technology Based on Image Recognition and Machine Learning," 2016, [Accessed Online Mar. 14, 2018] http://www.fujitsu.com/global/about/resources/news/press-releases/2016/1018-02.html.

Cisco Public, "Cisco Kinetic for Cities Lighting," Oct. 2017, 3 pages.

* cited by examiner

SYSTEM TO DETERMINE THE PLACEMENT OF SMART LIGHT EMITTERS

CROSS-REFERENCE TO RELATED APPLICATIONS

This application is a continuation of co-pending U.S. patent application Ser. No. 15/920,073, filed Mar. 13, 2018. The aforementioned related patent application is herein incorporated by reference in its entirety.

TECHNICAL FIELD

Embodiments presented in this disclosure generally relate to a system to control smart light emitters.

BACKGROUND

Smart lighting systems are becoming more and more prevalent, in a variety of environments. These systems, however, must be installed with careful attention paid to the placement of each light. Each smart light is manually configured, and its exact physical position is recorded in a configuration database along with an address associated with the smart light, for example an IP address. A smart lighting controller can individually control each light using this configuration database created during installation of the light.

But this manual configuration is both costly and inefficient. For example, if the address corresponding to each light is not recorded correctly during installation of the lights, it is very difficult and time consuming to create the database. Further, if the database is corrupted or contains errors, it is very difficult and time consuming to correct the database. And even if the database is configured correctly during installation, configuration of the database adds significantly to the complexity and difficulty of installation of the smart lights. In addition, manual configuration requires designating the lights with a pre-defined location, limiting the possible lighting effects.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
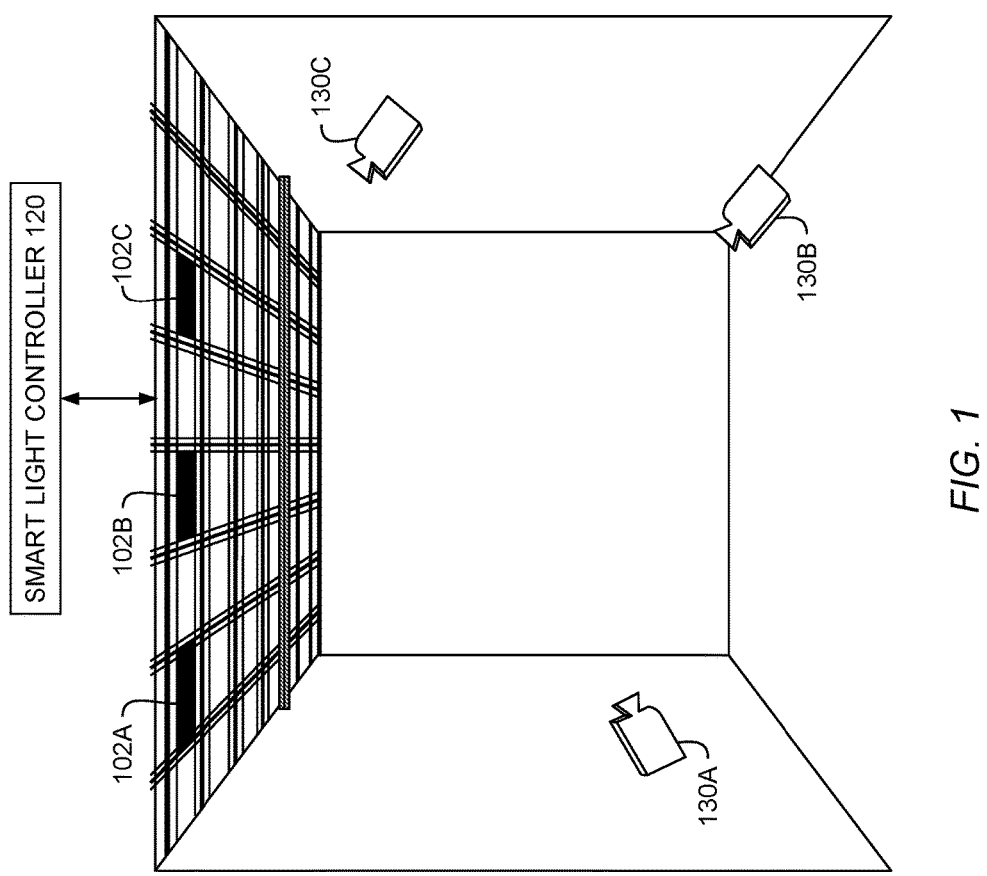
FIG. 1 illustrates a building interior with a plurality of smart lights, according to an embodiment.

Embodiments described herein include a computer implemented method. The method includes determining a target lighting pattern based on an instruction for a smart lighting effect. The method further includes retrieving from a database, based on the instruction, information identifying a first plurality of smart lights to activate as part of the smart lighting effect. The database includes a plurality of geographic locations relating to a second plurality of smart lights. The first plurality of smart lights is a subset of the second plurality of smart lights. The method further includes determining a plurality of network addresses for the first plurality of smart lights, based on the retrieved information. The method further includes generating a lighting effect command relating to the first plurality of smart lights, based on the target lighting pattern and the plurality of network addresses. The method further includes transmitting the lighting effect command to create the smart lighting effect. The first plurality of smart lights is configured to be activated in a manner consistent with the smart lighting effect, based on the lighting effect command.

Embodiments described herein further include a computer program product. The computer program product includes a non-transitory computer-readable storage medium storing code for execution by a processor. The code, when executed by a processor, performs an operation. The operation includes determining a target lighting pattern based on an instruction for a smart lighting effect. The operation further includes retrieving from a database, based on the instruction, information identifying a first plurality of smart lights to activate as part of the smart lighting effect. The database includes a plurality of geographic locations relating to a second plurality of smart lights. The first plurality of smart lights is a subset of the second plurality of smart lights. The operation further includes determining a plurality of network addresses for the first plurality of smart lights, based on the retrieved information. The operation further includes generating a lighting effect command relating to the first plurality of smart lights, based on the target lighting pattern and the plurality of network addresses. The operation further includes transmitting the lighting effect command to create the smart lighting effect. The first plurality of smart lights is configured to be activated in a manner consistent with the smart lighting effect, based on the lighting effect command.

Embodiments described herein further include a geographic lighting controller system. The system includes a processor and a memory. The memory contains a program that, when executed on the processor, performs an operation. The operation includes determining a target lighting pattern based on an instruction for a smart lighting effect. The operation further includes retrieving from a database, based on the instruction, information identifying a first plurality of smart lights to activate as part of the smart lighting effect. The database includes a plurality of geographic locations relating to a second plurality of smart lights. The first plurality of smart lights is a subset of the second plurality of smart lights. The operation further includes determining a plurality of network addresses for the first plurality of smart lights, based on the retrieved information. The operation further includes generating a lighting effect command relating to the first plurality of smart lights, based on the target lighting pattern and the plurality of network addresses. The operation further includes transmitting the lighting effect command to create the smart lighting effect. The first plurality of smart lights is configured to be activated in a manner consistent with the smart lighting effect, based on the lighting effect command.

Example Embodiments

Instead of configuring a database of smart lights during installation of the lights, it is possible to discover the geographic location of the lights after they have been installed through a series of captured videos of the lights displaying various patterns, and to store the geographic information in a computer database. If the smart lights have a particular orientation or directional illumination pattern, this can also be discovered through the series of captured videos and stored in the database. This automatic discovery process allows installation of smart lights without regard to which light is placed where, greatly speeding up and simplifying installation and removing the burden on installers to carefully track the installed location of each light.

Further, in an embodiment, the discovery process can automatically correct for any lights that are missed during the discovery process. For example, a remote controlled or autonomous vehicle, like a drone, could be used to capture the videos for the discovery process. After an initial series of videos are captured, the system can determine whether all of the smart lights have been captured by the existing videos. If not, the system can estimate the likely location of the missing lights, and can instruct the vehicle to move to the estimated location and capture additional videos. This allows for easy discovery of lights spread across a large area, for example inside, or outside, an office building.

The result of the automatic discovery process is a geographic smart light database that records a geographic position and orientation for each light, allowing the system to individually address each light based on its location, without requiring pre-defined locations. For example, in an embodiment, the database can record X-Y-Z coordinates corresponding to the light's location in the environment. This database correlates the geographic location of each light, and the light's orientation (if applicable), with identifying information for the light (e.g., a network address like an IP address). The database can be used to generate an almost unlimited number of sophisticated lighting effects that take the discovered light positions and orientations into account, without requiring arduous installation or pre-defined designations for where lights are placed.

FIG. 1 illustrates a building interior with a plurality of smart lights 102a, 102b, and 102c. In an embodiment, the smart lights 102a, 102b, and 102c are Internet of things (IoT) devices, and can be controlled through a computer network, like the internet. Each smart light 102a, 102b, and 102c is in communication with a smart light controller 120.

Figure 3:
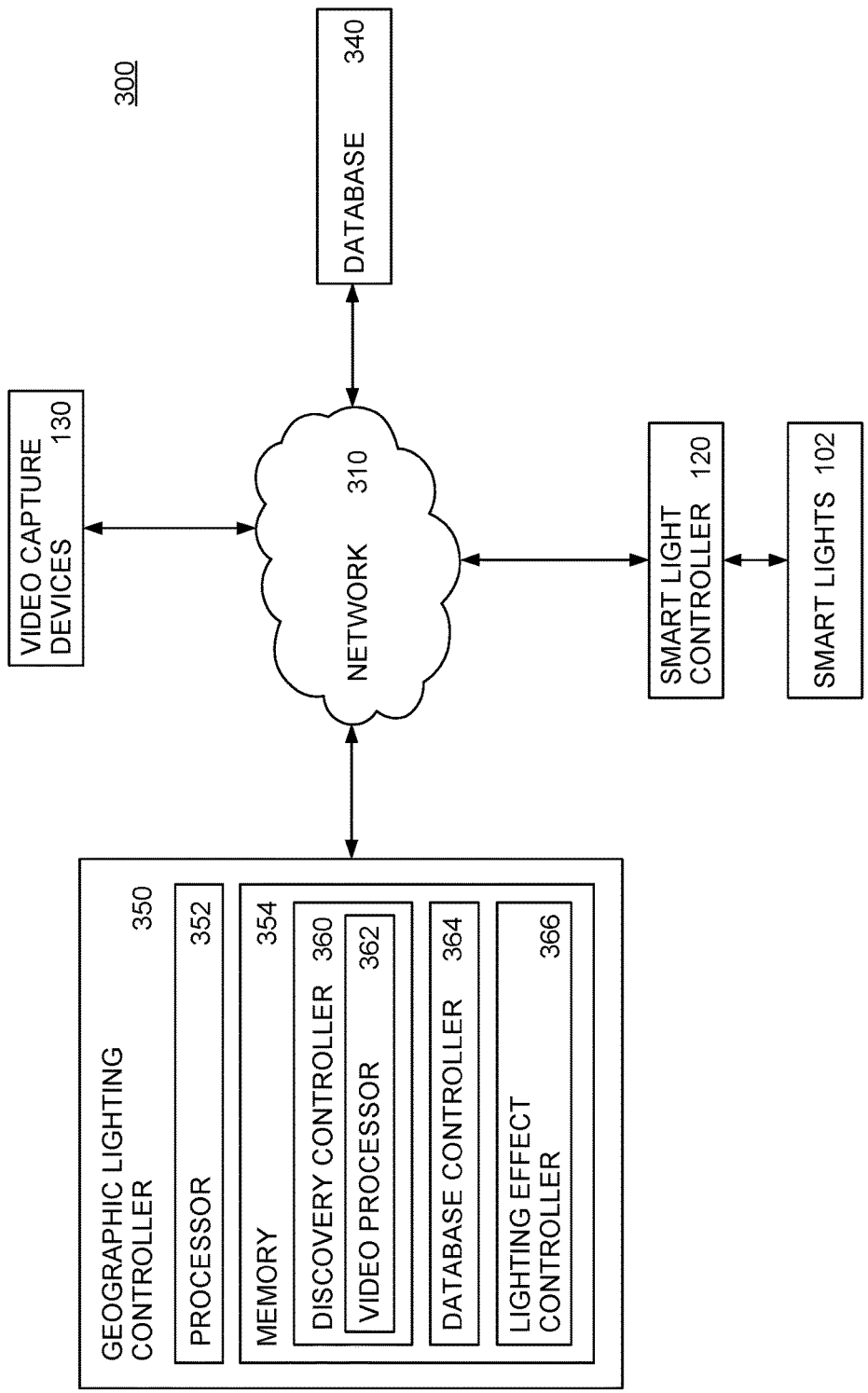
FIG. 3 is a block diagram illustrating a geographic smart light controller system, according to an embodiment.

In one embodiment, the smart light controller 120 is a separate component from the smart lights 102a, 102b, and 102c, and the smart lights 102a, 102b, and 102c communicate with the smart light controller using a suitable communication network (e.g., communication network 310 illustrated in FIG. 3). The smart light controller 120 can communicate with each of the smart lights 102a, 102b, and 102c using a unique address associated with the light, for example an IP address, sequential position on a serial daisy-chain, or a MAC address. In another embodiment, the smart light controller 120 can be integrated with one or more of the smart lights 102a, 102b, and 102c. For example, the smart light 102a could act as a smart light controller 120 for all three smart lights 102a, 102b, and 102c. Or in another example, each of smart lights 102a, 102b, and 102c could include its own smart light controller 120.

FIG. 1 further includes video capture devices 130a, 130b, and 130c. The video capture devices 130a, 130b, and 130c can be cameras or any other suitable device for capturing video of the environment. The video capture devices 130a, 130b, and 130c can also be connected with a suitable communication network (e.g., the communication network 310 in FIG. 3). The video capture devices 130a, 130b, and 130c can transmit captured images or video to storage or processing devices using the network. For example, the video capture devices 130a, 130b, and 130c could be video cameras connected to the internet or a local area network. Alternatively, the video capture devices 130 could be cameras integrated into a smart phone, tablet, or personal computer, and could be connected to a cellular or wireless network. As another alternative, as discussed further in relation to FIG. 2, the video capture devices 130 could be integrated within remote-controlled or autonomous vehicles (e.g., drones), configured to be controlled by a user. As discussed further in relation to FIGS. 4-8, the video capture devices 130 can be used to capture images of the smart lights 102 for use in determining the geographic location of each smart light 102a, 102b, and 102c.

Figure 2:
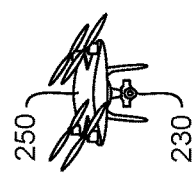
FIG. 2 illustrates a building exterior with a plurality of smart lights, according to an embodiment.
Figure 2:
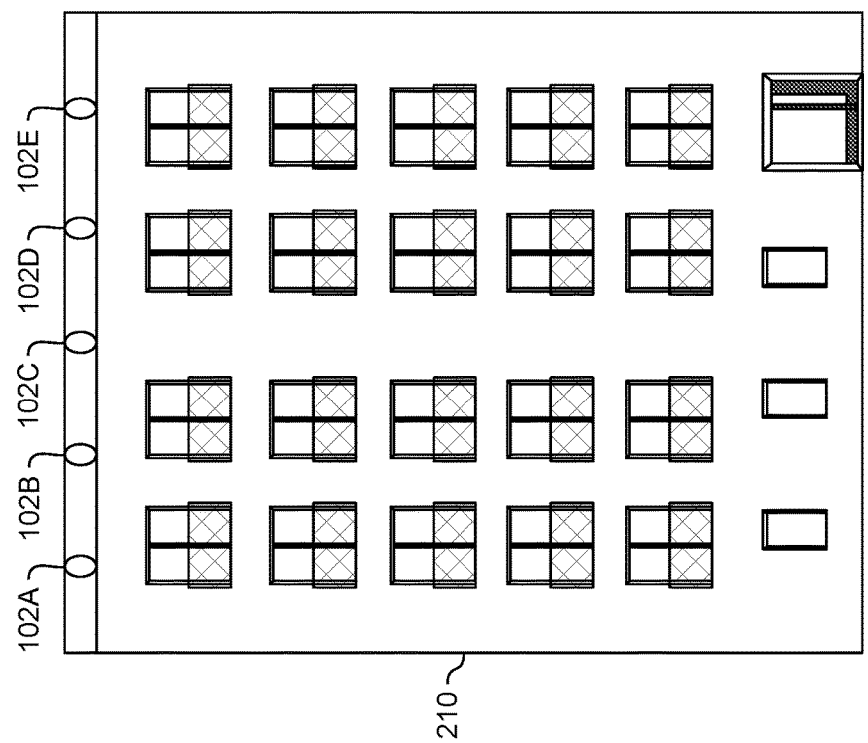

FIG. 2 illustrates the exterior of a building 210 with a plurality of smart lights 102a, 102b, 102c, 102d, and 102e. The smart lights 102a, 102b, 102c, 102d, and 102e illustrated in FIG. 2 are individually controllable using a smart light controller, for example smart light controller 120 illustrated in FIG. 1, through a communication network (e.g., communication network 310 illustrated in FIG. 3). FIG. 2 further illustrates a remote-controlled vehicle 250 with a video capture device 230. The vehicle 250 can be a drone, or any other suitable remote-controlled or autonomous vehicle. In an embodiment, the vehicle 250 can be controlled remotely using radio communication or other communication systems. In another example, the vehicle 250 is controlled autonomously by a controller on the vehicle 250 (e.g., a flight manager).

Like the video capture devices 130 illustrated in FIG. 1, the video capture device 230 can be any suitable video capture device. The video capture device 230 can be integrated within the vehicle 250, as illustrated in FIG. 2, can be integrated into another device (e.g., a smartphone, tablet, or personal computer), or can be a stand-alone device. The video capture device 230 can also be connected with a suitable communication network. The video capture device 230 can transmit captured images or video to storage or processing devices using the communication network. As discussed further in relation to FIGS. 4-8, the video capture device 230 can be used to capture images of the smart lights 102a, 102b, 102c, 102d, and 102e for use in determining the geographic location of each smart light 102a, 102b, 102c, 102d, and 102e.

FIG. 3 is a block diagram illustrating a geographic smart light controller system 300, according to an embodiment. The geographic smart light controller system 300 includes smart lights 102 and smart light controller 120. As described in more detail in relation to FIGS. 1 and 2, the smart light controller 120 can be used to individually control each of the smart lights 102. The smart light controller 120 can be integrated within the smart lights 102 or can be a separate component.

The geographic smart light controller system 300 further includes a geographic lighting controller 350, which can generate a database relating to the geographic locations of the smart lights 102, and can control operation of the smart lights 102 based on the geographic locations. The geographic lighting controller 350 includes a processor 352 and a memory 354. The processor 352 may be any computer processor capable of performing the functions described herein. Further, the processor 352 may be a single processor, multiple processors, a processor with a single core, a processor with multiple cores, or any other suitable configuration. Although memory 354 is shown as a single entity, the memory 354 may include one or more memory devices having blocks of memory associated with physical addresses, such as random access memory (RAM), read only memory (ROM), flash memory or other types of volatile and/or non-volatile memory. The geographic lighting controller 350 can be implemented on any suitable computing device. For example, the geographic lighting controller 350 can be implemented on a server computer, on a desktop computer, on a laptop computer, on a portable user device including a smartphone or tablet, or in a virtualized computing resource as part of a cloud computing system.

The memory 354 includes a discovery controller 360. The discovery controller 360 can be used to control discovery of the geographic locations of the smart lights 102, as described in relation to FIGS. 5-8. The discovery controller 360 includes a video processor 362. The video processor 362 can process video captured by the video capture devices 130 in order to discover the geographic locations of the smart lights 102, as described in relation to FIG. 7.

The memory 354 includes a database controller 364. In one embodiment, the database controller 364 controls access to the database 340, including writing data to the database 340 and reading data from the database 340. The memory 354 further includes a lighting effect controller 366. The lighting effect controller 366 controls operation of the smart lights 102, as described in relation to FIG. 4. In an embodiment, the database 340 is located separately from the memory 354. In another embodiment, the database 340 is stored within the memory 354, or in any other suitable location.

The geographic smart light controller system 300 further includes a communication network 310 to facilitate communication between the components of the system. The communication network 310 can be a wireless network, a wired network, a cellular network, fiber optical network, or any other suitable network. For example, the communication network 310 can be an Internet Protocol (IP) network, including a wide area network, a local area network, or the internet. The geographic lighting controller 350, video capture devices 130, database 340 and smart lighting controller 120 can each communicate using the communication network 310. As illustrated in FIG. 3, in one embodiment the smart lights 102 connect to the communication network 310 through the smart light controller 120. In another embodiment, the smart lights 102 connect to the communication network 310 directly.

Figure 4:
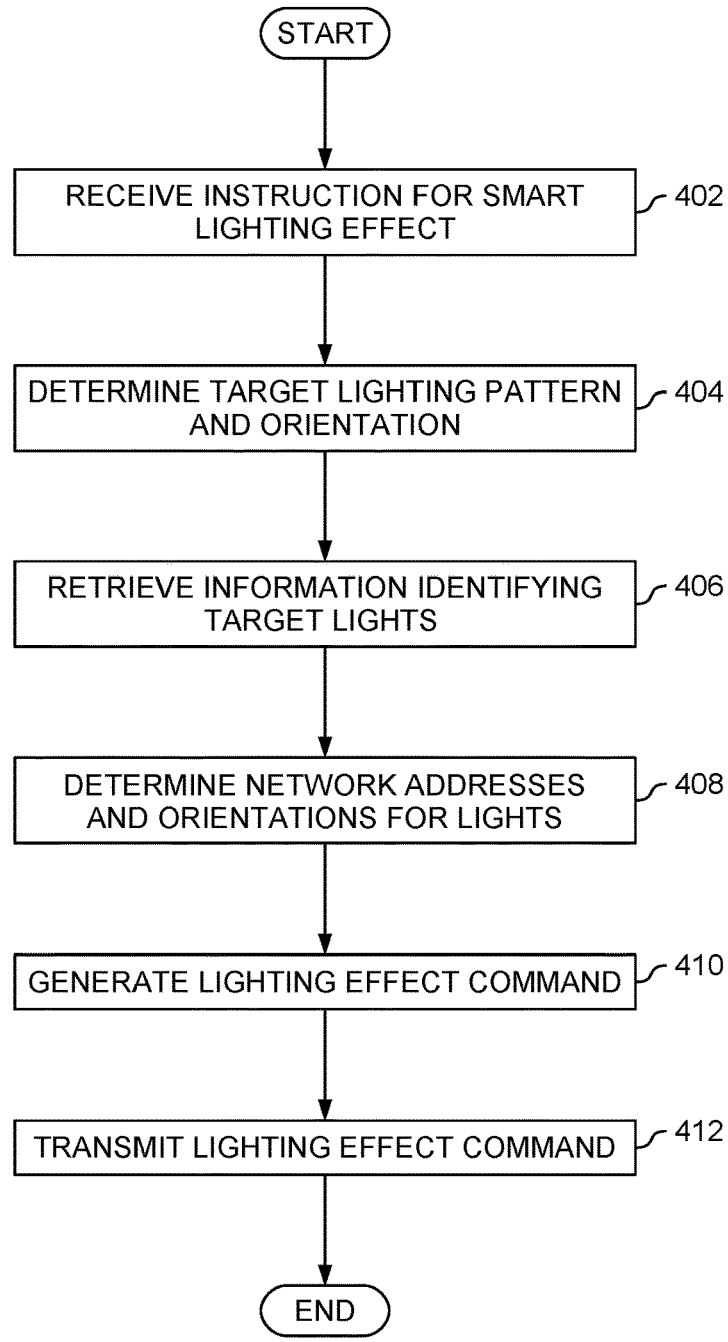
FIG. 4 is a flowchart for using a geographic smart light controller, according to an embodiment.

FIG. 4 is a flowchart for using a geographic smart light controller system 300, according to an embodiment. At step 402, the geographic lighting controller 350 receives an instruction for a smart lighting effect. In an embodiment, this instruction includes target geographic location information for the effect. The instruction can also include a desired pattern for the smart lights, a desired duration, etc. For example, during a fire drill or emergency situation, the geographic lighting controller 350 could receive a request that lights located in a particular area of a building near an emergency exit be brightened, changed in color, or flashed in order to help direct people inside the building to the appropriate exit. This instruction could, for example, include geographic information identifying the area of the building and information about how the lights should be activated. The geographic information could include a pre-defined location in the building (e.g., emergency exit A on floor 2), coordinates in a cartographic system (e.g., X-Y-Z coordinates), a cardinal direction (e.g., the northwest corner of floor 2), or any other suitable geographic designation. The instruction can include a request for a lighting pattern, for example a request to brighten some or all of the lights, dim the lights, change the color of the lights, blink the lights, create chase patterns, change the orientation at which the lights are shining, or any other suitable lighting pattern.

At step 404, the geographic lighting controller 350 determines a target lighting pattern and orientation, based on the instruction. As discussed above, in one embodiment the instruction can include the target lighting pattern. For example, the instruction could request that all lights in particular area be brightened, dimmed, etc. In another embodiment, the instruction includes a higher level request and the geographic lighting controller 350 determines the target pattern. For example, the instruction could be a request to activate emergency lighting. The geographic lighting controller 350 can determine that, based on this request, lights located near emergency exits should be brightened and lights near undesirable areas should be dimmed.

Similarly, in an embodiment the instruction could include a target lighting orientation. For example, the instruction could request that all lights shining in a direction toward a particular wall be activated. Alternatively, the instruction could specify that orientation is irrelevant and need not be taken into account. In another embodiment, the instruction could include a higher level request and the geographic lighting controller 350 could determine the target orientation. For example, as above, the instruction could be a request to activate emergency lighting. The geographic lighting controller 350 can determine that, based on this request, lights oriented to shine in a direction facing a hallway used for emergency exit should be brightened.

At step 406, the geographic lighting controller 350 retrieves from a database information identifying the target lights to be activated for the smart lighting effect. For example, as described in more detail in relation to subsequent figures, the database 340 can include information correlating particular smart lights with X-Y-Z coordinates (or other geographic designations). The geographic lighting controller 350 can translate the geographic information from the smart lighting effect instruction into X-Y-Z coordinates, if necessary, and form a database query for the address and orientation of lights located at or near the requested X-Y-Z coordinates. The details of the database query can be based both on the geographic information and the lighting request. For example, a request relating to an emergency exit might relate to lights located near the emergency exit and lights located along hallways leading to the emergency exit. The geographic lighting controller 350 can query the database for the address of lights located near the emergency exit and along specific hallways leading to the exit. This can be done based on pre-defined relationships accessible to the geographic lighting controller 350 (e.g., pre-defined correlations between emergency exits and particular hallways) or based on cartographic information (e.g., an interior map of the building accessible to the geographic lighting controller 350). It could also use indoor location services to locate specific users within the building, and then modify the settings of lights near that user.

The database controller 364 can then transmit the query to the database 340, and receive from the database 340 the addresses and orientations of lights to be controlled. In an embodiment, some or all of the lights may not have a defined orientation.

At step 408, the geographic lighting controller 350 can determine the network addresses and orientations for the lights based on the information received from the database. In an embodiment, the database stores network addresses and orientations directly, and so the information received form the database includes the network addresses and orientations for the lights. In another embodiment, the database stores an index corresponding to each light, and the geographic lighting controller uses this index to determine the network address and orientation for the lights.

At step 410, the lighting effect controller 366 generates a lighting effect command for the identified smart lights. The lighting effect command can be based on the target lighting pattern, the target lighting orientation, the network addresses of the lights and the orientations of the lights. For example, continuing with the emergency exit example above, the lighting effect controller 366 could generate a command that all the lights with the retrieved network addresses should be brightened, regardless of orientation. Alternatively, the lighting effect controller 366 could generate a command that only lights oriented in a particular direction should be brightened. The commands could also include time sequences, for example to blink selected lights every N seconds.

At step 412, the geographic lighting controller transmits the command generated at step 410. In an embodiment, this could be a single command transmitted to a smart light controller (e.g., the smart light controller 120) over an electronic network (e.g., the communication network 310). Alternatively, this could be a series of commands transmitted to the smart light controller over an electronic network. In another embodiment, the command could be transmitted directly to each smart light (e.g., each smart light of the smart lights 102), based on the determined network address for the light.

The emergency exit example discussed above is just one possible use case for the geographic lighting controller 350. The geographic lighting controller 350 can perform a huge number of customized lighting tasks using the database 340. For example, the geographic lighting controller 350 could be used to brighten lights near a particular office or cubicle for an employee working early in the morning or late at night, or could be used to create dramatic lighting effects like flashing lights during a particular positive development for the business (e.g., a particularly profitable sale, a long-awaited product launch, or a new high for company stock). Because it includes orientation information, the geographic lighting controller 350 could be used to create complex lighting effects to facilitate photography or video capture, like brightening lights behind a designated camera location while dimming lights shining into the camera location. Because the geographic lighting controller 350 can control lighting effects based on awareness of the geographical location of the lights, there are countless possibilities.

Figure 5:
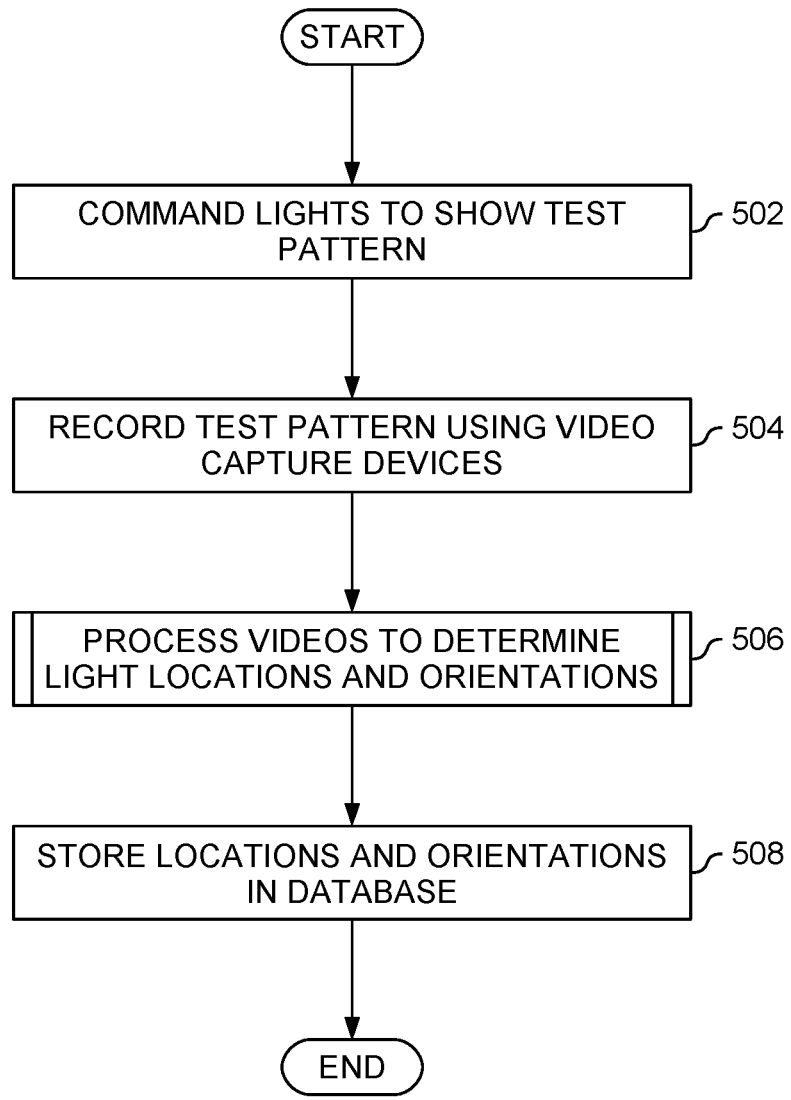
FIG. 5 is a flowchart for discovering geographic locations of smart lights, according to an embodiment.

FIG. 5 is a flowchart for discovering geographic locations of smart lights, according to an embodiment. At step 502, the discovery controller 360 transmits a command to the smart light controller 120 to show a test pattern. In an embodiment, the smart lights 102 and smart light controller 120 can be configured to display a test pattern for use in discovering the geographic location of each smart light 102. The smart lights 102 could be configured to begin with a defined preamble, used to identify that the test pattern is beginning, followed by a defined sequence, used to identify the geographic location of each smart light. For example, every light could flash on and off 5 times (i.e., the preamble) and then each light could sequentially flash on for a pre-defined period of time and then turn off, in the order in which the lights are addressed (i.e., the defined sequence). By noting the time between the preamble and the activation of a light being observed in the video, the discovery controller 360 can determine which specific light is being addressed at each time. This test pattern facilitates discovery of the geographic location of each light, so that the geographic location can be correlated with the light's address.

At step 504, the test pattern is recorded using video capture devices. As discussed in relation to FIGS. 1 and 2, in an embodiment the test pattern show in response to the command issued at step 502 can be recorded by video capture devices. As discussed in relation to FIG. 1, the video capture devices can be stand-alone video cameras, cameras integrated into smartphones or tablets, cameras integrated into vehicles, or any other suitable capture device. The recordings can then be used to determine X-Y-Z coordinates associated with each of the smart lights, in order to allow geographic control of the smart lights. In an embodiment, video of the test pattern is captured from at least two different vantage points. Preferably, each light being discovered can be seen from at least two different angles in the captured video. This allows the video processor 362 to determine the X-Y-Z coordinates of each light in step 506.

At step 506, the video processor 362 of the geographic light controller 350 processes the videos captured in step 504 to determine the location and orientation of the smart lights. This is discussed in more detail in relation to FIGS. 6-8. In an embodiment, the location of each light can be represented as X-Y-Z coordinates for the centroid of the light as observed in the video frames associated with the time elapsed after the preamble when that light is activated. Further, in an embodiment, the X-Y-Z coordinate can be associated with a wire-frame geometry of the environment to which the light is attached, for example the interior ceiling illustrated in FIG. 1.

At step 508, the database controller 364 stores the location and orientation of each light, along with its addressing information in the database 340. This is discussed in more detail in relation to FIG. 9.

Figure 6:
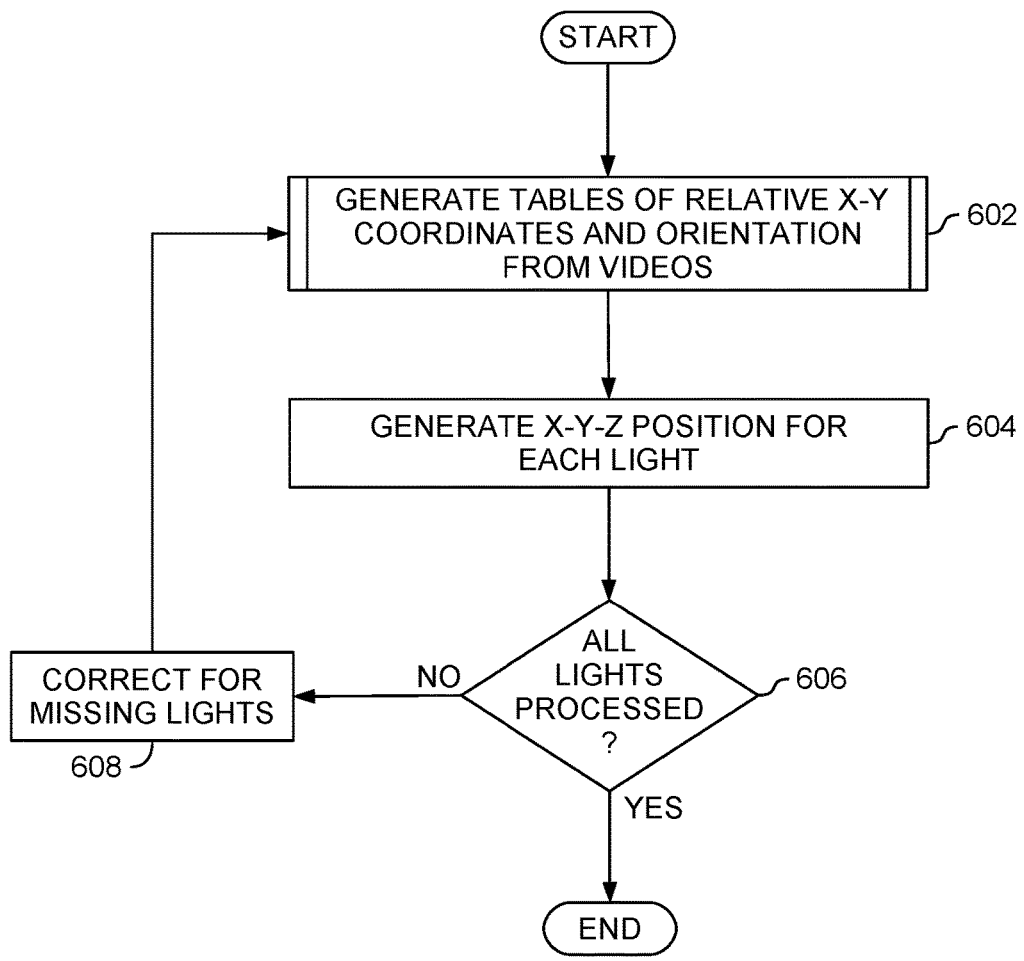
FIG. 6 is a flowchart for determining geographic locations of smart lights based on captured videos, according to an embodiment.

FIG. 6 is a flowchart for determining geographic locations of smart lights based on captured videos, according to an embodiment. At step 602, the video processor 362 generates tables of relative X-Y coordinates for each light, along with any orientation of the light, based on the captured videos. In an embodiment, the video processor 362 generates a table for each captured video. This is discussed in more detail in relation to FIG. 7. As discussed above, the video processor 362 can be implemented in a portable device like a smartphone or tablet, in a cloud computing environment, or in any other suitable computing system. For example, the video capture device 130 could be a camera on a smartphone or tablet. The video processor 362 could then be implemented as part of an application running on the same smartphone or tablet. Alternatively, the smartphone or tablet could upload the captured videos to a cloud computing environment, and the video processor 362 could be implemented in a virtualized computing system in the cloud computing environment.

At step 604, the video processor 362 processes the values in the tables of X-Y coordinates to generate X-Y-Z coordinates for each light. As a result of step 604, each light should have relative X-Y coordinates from the video for the light's centroid in at least two tables, because each light was captured in at least two videos. These X-Y coordinates are relative, because they designate the location of each light relative to the other lights, but not necessarily relative to other objects in the environment.

For each light, a geometric transform algorithm can be used to correlate the multiple X-Y coordinate values and determine an X-Y-Z coordinate value for the light's centroid. The geometric transform algorithm can calculate backprojections and triangulations for the light, and use these values to determine X-Y-Z coordinates for the light's centroid. For example, a particular light might appear high and in the center in one captured video, and would have corresponding X-Y coordinates stored in a table corresponding to that video. The same light might appear high and to the left in a second captured video, and would have corresponding X-Y coordinates stored in a second table corresponding to that video. Using a geometric transform algorithm, the video processor 362 can determine X-Y-Z coordinates for the light, based on these two tables of X-Y coordinates. Geometric transform algorithms suitable to calculate backprojections and triangulations for a light in order to determine X-Y-Z coordinates for the light are well-known and will be readily apparent to a person having ordinary skill in the art.

The accuracy of the X-Y-Z coordinate for the centroid of each light can be further enhanced using reference points in the physical world in which the light is placed. The X-Y-Z coordinates determined based solely on the captured videos will be precise in terms of the relative locations of the lights (i.e., the distances between each light), but may be less accurate in terms of the absolute physical location. This can be refined based on knowledge of physical reference points in the environment. For example, it might be known that ceiling lights in the interior of a building (e.g., smart lights 102a, 102b, and 102c in FIG. 1) are 2 feet square, spaced 6 feet from each wall and from each other. Using these physical reference points, the video processor 362 can calibrate its processing and refine the X-Y-Z coordinates associated with each light to provide even more precise coordinates for the physical location of the lights.

Alternatively, if the physical location of the video capture devices is known, the video processor can use this information to calibrate its processing and refine the X-Y-Z coordinates. Knowledge of the physical location could come from any suitable source, including GPS, indoor location service, placement in a known location, or input from a user. For example, if the video capture device is a smartphone, GPS information and camera angle and lens setting information could be automatically recorded by the smartphone when the video is captured. The video processor 362 could use this GPS and camera angle information to calibrate its processing and refine the absolute X-Y-Z coordinates of each light. As discussed above, in an embodiment the X-Y-Z coordinates of the lights can be associated with a wire-frame geometry of the environment in which the lights are placed. Information about the physical environment surrounding the lights, including reference points, GPS information, and other information, can also be used to enhance this wire-frame geometry.

At step 606, the geographic lighting controller 350 determines whether all lights have been processed. For example, as discussed above, to determine the X-Y-Z coordinates for a light, the light should have been captured by at least two videos. If a light appears in only one video, or the system otherwise lacks sufficient information to determine the X-Y-Z coordinate for the light, the geographic lighting controller 350 determines that correction is needed (e.g., additional videos relating to the missing light). As another example, the geographic lighting controller 350 can maintain a list of identifiers (e.g., IP addresses or MAC addresses) associated with each smart light in the system. If a smart light appears in this list, but is not visible in any of the captured videos, correction is needed. At step 608, the geographic lighting controller 350 corrects for the missing lights. This is discussed in more detail in relation to FIG. 8. Returning to step 606, if the geographic lighting controller 350 determines that all lights have been processed, the process concludes.

Figure 7:
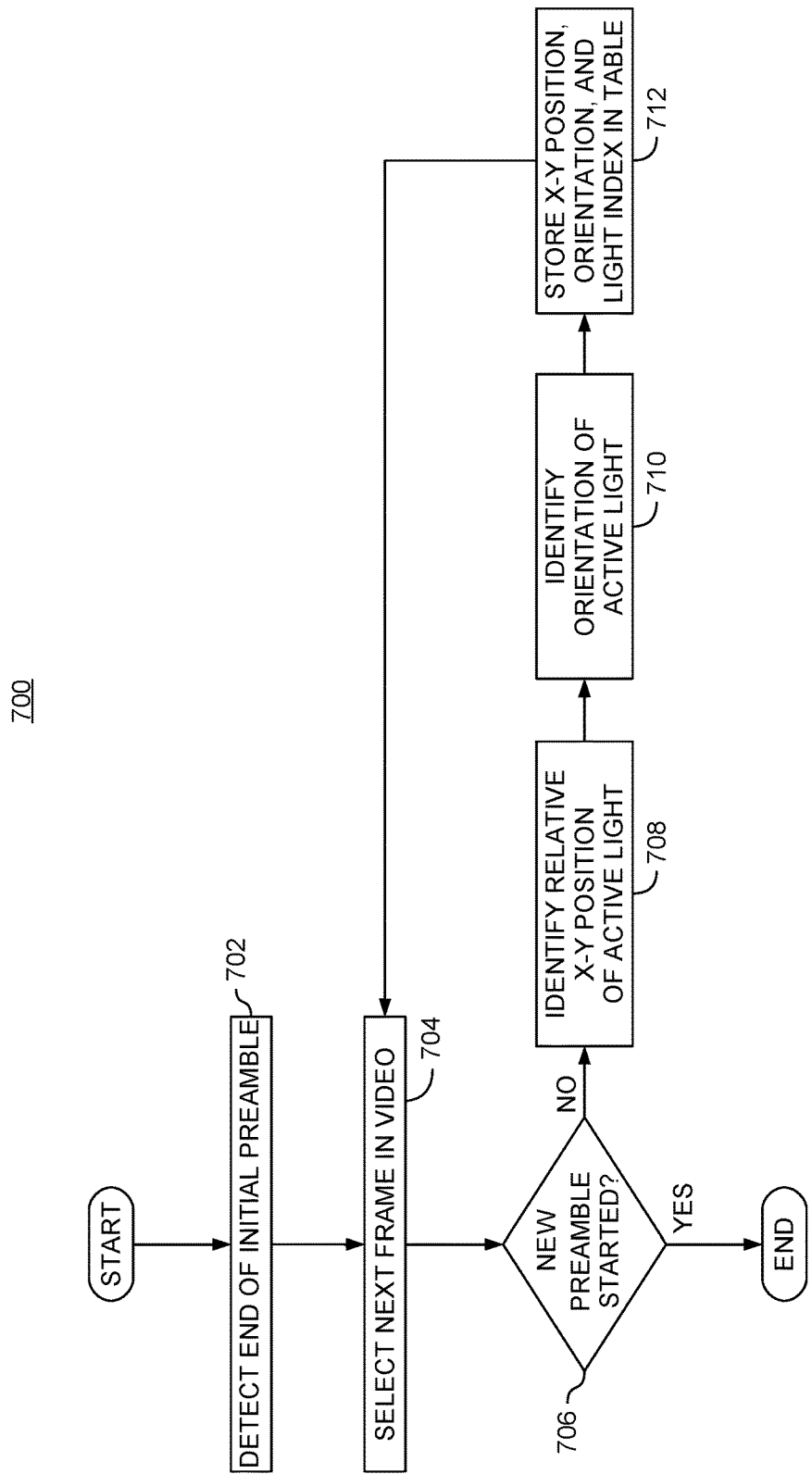
FIG. 7 is a flowchart for determining relative positions of smart lights based on captured videos, according to an embodiment.

FIG. 7 is a flowchart for determining relative positions of smart lights based on captured videos, according to an embodiment. As discussed above in relation to FIG. 6, at step 602 the video processor 362 processes each video and generates, for each video, a table of X-Y coordinates of the centroid of each light visible in the video. FIG. 7 illustrates this process.

The video processor 362 begins by analyzing the first video. At step 702, the video processor 362 detects the end of the initial preamble in the video. As discussed above in relation to step 502 of FIG. 5, the smart lights can be controlled to emit a specific sequential pattern signaling the beginning of the discovery process. This pattern could be emitted by all lights in unison. For example, the lights could be controlled to all, simultaneously, flash on and off a pre-determined number of times, at a predetermined repetition rate. This is an example of a preamble. The video processor 362 analyzes the video and, at step 702, detects the end of this preamble.

At step 704, the video processor 362 detects the next frame in the video. As discussed above in relation to step 502 of FIG. 5, after the smart lights complete the preamble they enter into a defined sequence. For example, each light can sequentially turn on for a pre-determined length of time, while the other lights are all off. In an embodiment, the video processor 362 does not need to analyze every frame in the video to determine the X-Y position associated with each light. It simply needs to analyze at least one frame showing each light when it is on, while the remaining lights are off. Thus, the video processor 362 need only analyze each Nth frame in the video, where N is determined by the frame rate of the video capture device and the rate at which each light turns on and off in the defined sequence. For example, if the video capture device runs at 30 frames-per-second, and the defined sequence runs at 10 Hz, N=3, meaning the video processor should analyze every 3rd frame.

At step 706, the video processor 362 determines whether a new preamble has started, based on the lights that are on in the current frame. In an embodiment, the preamble and defined sequence repeat multiple times. A new preamble starting signals that the discovery sequence has ended. If the preamble has not started again, the process moves to step

708, and the video processor identifies the relative X-Y position of the light that is active in the current frame. As discussed above, one, and only one, light should be active in the current frame. Image processing techniques could be used, for example, to suppress the images of lights seen by the camera in wall mirrors or other reflective surfaces, preventing false position calculations. In an embodiment, object detection algorithms, as are well known in the art, can be used to determine the X-Y coordinates for the centroid of the light that is active in the frame.

At step 710, the video processor 362 determines the orientation of the light that is active in the current frame. Object detection algorithms, as are well known in the art, can be used for this step as well. Step 710 could record the relative brightness of each light. When these are compared for the same light in videos taken from different vantage points, the direction of emission from each light source can be estimated. Vantage points more on-axis with the preferred light emission angle of the fixture will record higher brightness. At step 712, the video processor 362 stores the X-Y coordinates for the light and the orientation for the light, along with an index associated with the light, in a table. In an embodiment, the light may be omnidirectional—that is it may not have a specific orientation. In this circumstance the video processor 362 can store a value indicating the lack of orientation, or can store no value at all in a field related to the orientation.

The index associated with the light can be any suitable value to allow the geographic light controller 350 to identify the light. In one embodiment, the index could be an address used to communicate with the light, like an IP address. In this embodiment, the discovery controller 360 would receive an address range associated with the lights being discovered. As part of the defined sequence, the discovery controller 360 could turn the lights on, sequentially, based on the address (e.g., address_1 first, then address_2, etc. up to address_n). The video processor 362 can use this information, and its knowledge of which video frame is being processed, to determine the address associated with the light that is on in the video frame. The video processor 362 could then store the address information in the table of X-Y values associated with that video. Alternatively, the video processor 362 could use the video duration, or SMPTE time code associated with the video frame (rather than frame number) to determine the address associated with the light that is on. In both instances, the video processor 362 could store the address associated with the light in a table, along with the X-Y coordinates for the light. In another embodiment, the video processor 362 could use a simple index for each light (e.g., 1, 2, 3, etc.), and could store the index in the table of X-Y values, rather than an address. The video processor 362 could then use that index to later determine the address associated with each light.

The process then returns to step 704, and the video processor 362 selects the next frame in the video. If this frame shows that the preamble has not started, the processor repeats at step 708. If the preamble has started, the process ends. To save processing time, step 704 could skip ahead several video frames per loop execution if the video frame rate is significantly faster than the defined sequence update rate.

Figure 8:
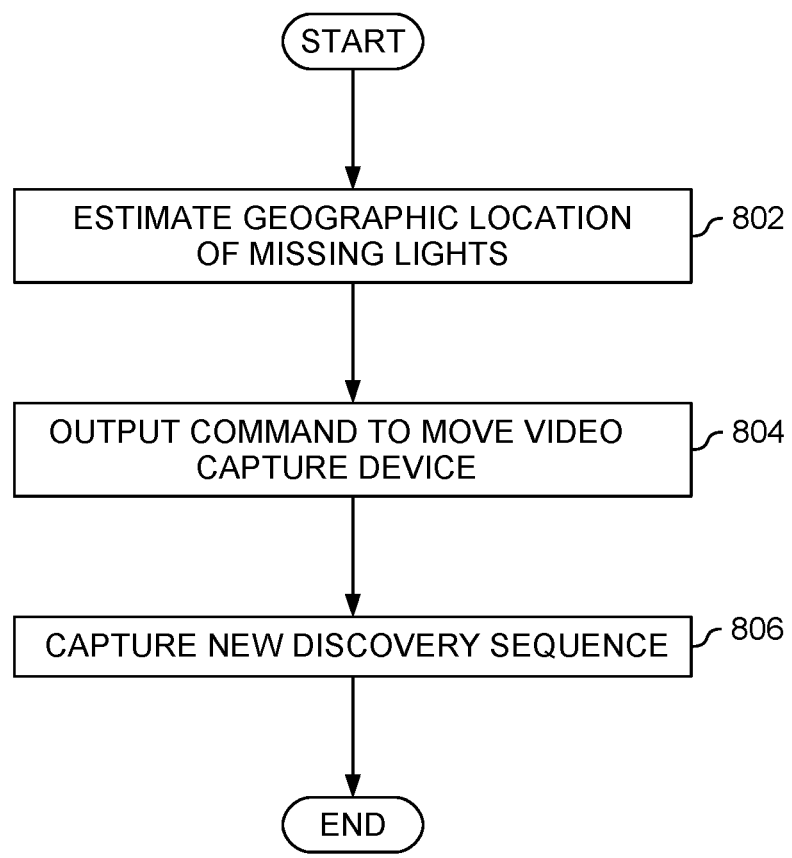
FIG. 8 is a flowchart for correcting for lights missing in captured videos, according to an embodiment.

FIG. 8 is a flowchart for correcting for lights missing in captured videos, according to an embodiment. As discussed above in relation to step 606 in FIG. 6, the videos captured by the video capture devices may not be sufficient to determine the X-Y-Z coordinates associated with each smart light. For example, a light might have been visible from only one camera angle. Or the light might not have been visible from any angle. Additional video is necessary to determine the X-Y-Z coordinates associated with the missing lights.

At step 802, the geographic lighting controller 350 estimates the geographic location of the missing lights. For example, any known information about the missing light can be used. If the missing light has been captured by one video, the X-Y coordinate table associated with that video will include the missing light. That table can be used to estimate the geographic location of the missing lights. As one example, the geographic lighting controller 350 can use the X-Y coordinate table to determine which lights are nearby the missing light. The geographic location of these lights should already be known, and so the missing light can be estimated to be in the same general geographic vicinity. Alternatively, if the missing light has not been captured by any video, the light could be assumed to be nearby lights with similar address values. While lights are not assumed to be placed in sequential order based on their address, it is somewhat likely that a light is located in general vicinity of lights with similar addresses.

At step 804, the geographic lighting controller 350 outputs a command to move the video capture device to capture the estimated geographic area. For example, if missing light is estimated to be nearby lights located in the southwest side of the building, the geographic lighting controller 350 could output a command to move the video capture device nearer to the southwest side of the building. In an embodiment, the video capture device can be located in a remote controlled or autonomous vehicle, like a drone. The geographic lighting controller 350 could output a command to move the drone to the desired geographic location. In one embodiment, this could be done automatically, with no user input. In another embodiment, the command could be sent to a user, who could control the vehicle or video capture device.

At step 806, a new discovery sequence is captured, using the video capture device at the new location. In an embodiment, the discovery controller 360 could instruct the smart lights to undergo the discovery sequence, including the preamble and the defined sequence. The video capture device can then capture the sequence from the new perspective, focused on the geographic area where the missing light is expected to be. In an embodiment, if the missing light has not been captured by any videos, two sequences could be captured, from two different angles. The sequence then ends and, as discussed in FIG. 6, returns to step 602 of FIG. 6 so that the videos can be re-processed with the addition of the newly captured video. In an embodiment, if, after several attempts through the process of FIG. 8, the light in question still does not appear, an error message is generated to the technicians to check that the light in question is indeed operational.

The process for correcting missing lights, illustrated in FIG. 8, can be particularly advantageous for smart lights located outside of a building, as illustrated in FIG. 2, or in a large building. Use of a remote controlled or autonomous vehicle, like a drone, and the feedback system provided in FIGS. 6-8, can allow for automatic discovery of all smart lights spread across a large area. By eliminating manual discovery and calibration of the smart lights, this great increases the accuracy of the control of smart lights and reduces the setup cost, among other advantages.

Figure 9:
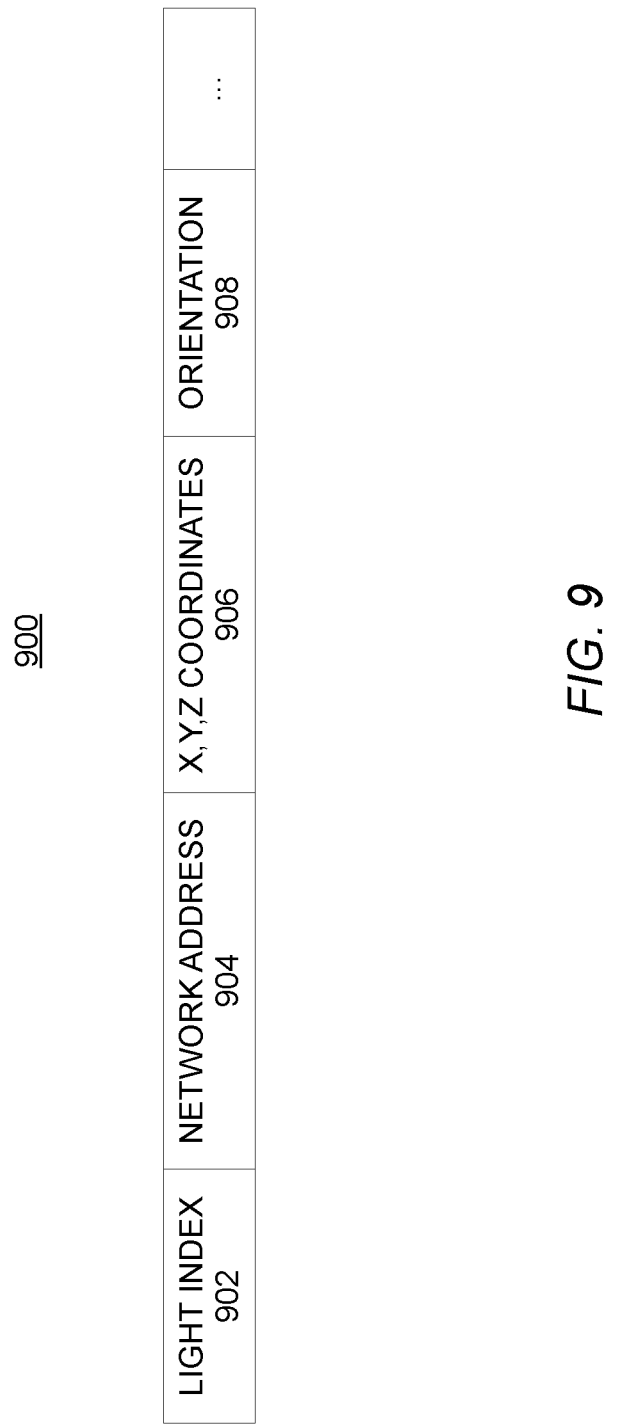
FIG. 9 illustrates a database row recording geographic information about a smart light, according to an embodiment.

FIG. 9 illustrates a database row recording geographic information about a smart light, according to an embodiment. The database, for example the database 340 illustrated in FIG. 3, can include numerous fields suitable to allow the geographic lighting controller 350 to control operation of the smart lights. The fields illustrated in FIG. 9 are merely examples. For example, the database can include fields related to the brightness or intensity of the smart light, the color of the smart light, pre-defined patterns or effects for the smart light, or many other fields.

Field 902 records an index value associated with the smart light. As discussed above, this index can be any value suitable for the geographic lighting controller 350 to identify the smart light. Field 904 records a network address associated with the smart light. This address can be any address suitable to facilitate communication between the geographic lighting controller 350 and the smart light, for example an IP address sequential position on a serial daisy-chain, or a MAC address. In an embodiment, fields 902 and 904 can be combined, and the smart light's network address can also be used as an index. Field 906 records the X-Y-Z coordinates associated with the smart light's location in its physical environment, as discussed above in relation to FIGS. 6 and 7. While X-Y-Z coordinates are discussed as an example, field 906 can record any value suitable to identify the light's location in its physical environment, using any suitable coordinate system. FIG. 908 records the orientation of the smart light. In one embodiment, this could be one of a number of pre-defined values (e.g., "no-orientation," "down," "left", "down and left"). In another embodiment, this could be an angle representing the angle at which the light shines. As discussed above, this field can also be left blank if the light does not have an associated orientation. Some light fixtures may contain several banks of emitters, each directed in a different direction (e.g. North, East, South, West and Down). These could be treated as separate fixtures, creating e.g. five line entries in table 900. Or, the orientation of a specific key direction could be noted in a single table entry, and other directions derived from it.

Maintaining a database recording the geographical positions of the smart lights, like the database illustrated in FIG. 9, facilitates many different improved uses for the lights. For example, the lights can be sorted based on their geographic location, allowing for fast activation (or de-activation) of lights in a particular location or particular order. Further, as discussed above, the lighting effect controller 366 can use the database to generate any number of useful lighting effects, from improved emergency lighting, to precise location-based or directional lighting, to elaborate lighting effects and entertaining animations. The individual smarts lights can even be used as rudimentary pixels, to spell out text messages or show desired graphics.

The detailed embodiments described above have focused on smart lights placed inside, or outside, of buildings. But the embodiments described herein are not so limited. The geographic lighting controller could be used to control smart lights located almost anywhere, including decorative lights used for a holiday, street lights, landscape lights, etc. For example, the controller could be used to create sophisticated holiday lighting effects. Or it could be used to active street lights in a particular pattern in case of a disaster, to facilitate evacuation.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

A user can access any of the resources that reside in the cloud at any time, and from anywhere across the Internet. In context of the present disclosure, a user may access applications (e.g., the geographic lighting controller 350 illustrated in FIG. 3, including the discovery controller 360, the video processor 362, the database controller 364, and the lighting effect controller 366) or related data available in the cloud. For example, video captured by the video capture device 130 could be transmitted to a computing system in the cloud, and the geographic lighting controller 350 could operate on a computing system in the cloud. In such a case, the database 340 could also be located in the cloud, and the geographic lighting controller 350 could store data at a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer implemented method, comprising:
   determining a target lighting pattern based on an instruction for a smart lighting effect;
   retrieving from a database, based on the instruction, information identifying a first plurality of smart lights to activate as part of the smart lighting effect, wherein the database comprises a plurality of geographic locations relating to a second plurality of smart lights, and wherein the first plurality of smart lights is a subset of the second plurality of smart lights;
   determining a plurality of network addresses for the first plurality of smart lights, based on the retrieved information;
   generating a lighting effect command relating to the first plurality of smart lights, based on the target lighting pattern and the plurality of network addresses; and
   transmitting the lighting effect command to create the smart lighting effect, wherein the first plurality of smart lights is configured to be activated in a manner consistent with the smart lighting effect, based on the lighting effect command.

2. The method of claim 1, wherein the database is populated through a discovery process, the discovery process comprising:
   transmitting a command to the second plurality of smart lights to activate in a pre-defined test pattern;
   capturing a plurality of videos of the pre-defined test pattern;
   determining locations of at least some of the smart lights in the second plurality of smart lights, based on processing the plurality of videos; and
   storing the locations in the database.

3. The method of claim 2, wherein determining locations of at least some of the smart lights in the second plurality of smart lights, based on processing the plurality of videos, further comprises:
   generating, for each video of the plurality of videos, a table including X-Y coordinates corresponding to each smart light visible in the respective video; and
   determining, based on the plurality of tables, X-Y-Z coordinates corresponding to at least some of the smart lights in the second plurality of smart lights.

4. The method of claim 3, wherein generating, for each video of the plurality of videos, a table including X-Y coordinates corresponding to each smart light visible in the video further comprises:
- detecting a conclusion of a pre-defined preamble sequence in the video;
- selecting a next frame of the video;
- identifying X-Y coordinates corresponding to an active light in the frame; and
- storing the X-Y coordinates in the table.

5. The method of claim 2, wherein the discovery process further comprises:
- determining, based on processing the plurality of videos, that the location of a first smart light, of the second plurality of smart lights, has not been determined;
- estimating the geographic location of the first smart light, based on the determined locations;
- transmitting a command to move a video capture device to a location to capture video of lights located in the estimated geographic location; and
- capturing an additional video of the pre-defined test pattern, using the video capture device.

6. The method of claim 5, wherein the discovery process further comprises:
- determining, based on processing the additional video, that the location of the first smart light has not been determined, and in response providing notification to a user.

7. The method of claim 5, wherein the video capture device is located in a vehicle and wherein the command to move the video capture device comprises a command to move the vehicle.

8. The method of claim 7, wherein the vehicle is a drone.

9. The method of claim 1, further comprising:
- determining a target lighting orientation, based on the instruction for the smart lighting effect; and
- determining a plurality of orientations for the first plurality of smart lights, based on the retrieved information, wherein the lighting effect command is further based on the target lighting orientation and the plurality of orientations.

10. A computer program product, comprising:
a non-transitory computer-readable storage medium storing code for execution by a processor, wherein the code, when executed by a processor, performs an operation, the operation comprising:
- determining a target lighting pattern based on an instruction for a smart lighting effect;
- retrieving from a database, based on the instruction, information identifying a first plurality of smart lights to activate as part of the smart lighting effect, wherein the database comprises a plurality of geographic locations relating to a second plurality of smart lights, and wherein the first plurality of smart lights is a subset of the second plurality of smart lights;
- determining a plurality of network addresses for the first plurality of smart lights, based on the retrieved information;
- generating a lighting effect command relating to the first plurality of smart lights, based on the target lighting pattern and the plurality of network addresses; and
- transmitting the lighting effect command to create the smart lighting effect, wherein the first plurality of smart lights is configured to be activated in a manner consistent with the smart lighting effect, based on the lighting effect command.

11. The computer program product of claim 10, the operation further comprising:
- transmitting a command to the second plurality of smart lights to activate in a pre-defined test pattern;
- capturing a plurality of videos of the pre-defined test pattern;
- determining locations of at least some of the smart lights in the second plurality of smart lights, based on processing the plurality of videos; and
- storing the locations in the database.

12. The computer program product of claim 11, wherein determining of at least some of the smart lights in the second plurality of smart lights, based on processing the plurality of videos, further comprises:
- generating, for each video of the plurality of videos, a table including X-Y coordinates corresponding to each smart light visible in the respective video; and
- determining, based on the plurality of tables, X-Y-Z coordinates corresponding to at least some of the smart lights in the second plurality of smart lights.

13. The computer program product of claim 11, wherein the operation further comprises:
- determining, based on processing the plurality of videos, that the location of a first smart light, of the second plurality of smart lights, has not been determined;
- estimating the geographic location of the first smart light, based on the determined locations;
- transmitting a command to move a video capture device to a location to capture video of lights located in the estimated geographic location; and
- capturing an additional video of the pre-defined test pattern, using the video capture device.

14. The computer program product of claim 13, wherein the video capture device is located in a vehicle and wherein the command to move the video capture device comprises a command to move the vehicle.

15. A geographic lighting controller system, comprising:
a processor; and
a memory containing a program that, when executed on the processor, performs an operation, the operation comprising:
- determining a target lighting pattern based on an instruction for a smart lighting effect;
- retrieving from a database, based on the instruction, information identifying a first plurality of smart lights to activate as part of the smart lighting effect, wherein the database comprises a plurality of geographic locations relating to a second plurality of smart lights, and wherein the first plurality of smart lights is a subset of the second plurality of smart lights;
- determining a plurality of network addresses for the first plurality of smart lights, based on the retrieved information;
- generating a lighting effect command relating to the first plurality of smart lights, based on the target lighting pattern and the plurality of network addresses; and
- transmitting the lighting effect command to create the smart lighting effect, wherein the first plurality of smart lights is configured to be activated in a manner consistent with the smart lighting effect, based on the lighting effect command.

16. The geographic lighting controller system of claim 15, the operation further comprising:
- transmitting a command to the second plurality of smart lights to activate in a pre-defined test pattern;
- capturing a plurality of videos of the pre-defined test pattern;
- determining locations of at least some of the smart lights in the second plurality of smart lights, based on processing the plurality of videos; and
- storing the locations in the database.

17. The geographic lighting controller system of claim 16, wherein determining locations of at least some of the smart lights in the second plurality of smart lights, based on processing the plurality of videos, further comprises:
- generating, for each video of the plurality of videos, a table including X-Y coordinates corresponding to each smart light visible in the respective video; and
- determining, based on the plurality of tables, X-Y-Z coordinates corresponding to at least some of the smart lights in the second plurality of smart lights.

18. The geographic lighting controller system of claim 17, wherein generating, for each video of the plurality of videos, a table including X-Y coordinates corresponding to each smart light visible in the video further comprises:
- detecting a conclusion of a pre-defined preamble sequence in the video;
- selecting a next frame of the video;
- identifying X-Y coordinates corresponding to an active light in the frame;
- identifying corresponding to the active light in the frame; and
- storing the X-Y coordinates in the table.

19. The geographic lighting controller system of claim 16, wherein the operation further comprises:
- determining, based on processing the plurality of videos, that the location of a first smart light, of the second plurality of smart lights, has not been determined;
- estimating the geographic location of the first smart light, based on the determined locations;
- transmitting a command to move a video capture device to a location to capture video of lights located in the estimated geographic location; and
- capturing an additional video of the pre-defined test pattern, using the video capture device.

20. The geographic lighting controller system of claim 19, wherein the video capture device is located in a vehicle and wherein the command to move the video capture device comprises a command to move the vehicle.

* * * * *